United States Patent
Shiina et al.

(10) Patent No.: US 10,871,573 B2
(45) Date of Patent: Dec. 22, 2020

(54) TIMING SIGNAL OUTPUT DEVICE, AND ELECTRONIC APPARATUS

(71) Applicant: Seiko Epson Corporation, Tokyo (JP)

(72) Inventors: Jun Shiina, Minowa (JP); Yoshiyuki Maki, Suwa (JP)

(73) Assignee: Seiko Epson Corporation

( * ) Notice: Subject to any disclaimer, the term of this patent is extended or adjusted under 35 U.S.C. 154(b) by 349 days.

(21) Appl. No.: 15/904,799

(22) Filed: Feb. 26, 2018

(65) Prior Publication Data

US 2018/0246216 A1    Aug. 30, 2018

(30) Foreign Application Priority Data

Feb. 27, 2017   (JP) .................................. 2017-035563

(51) Int. Cl.
| | |
|---|---|
| *G01S 19/23* | (2010.01) |
| *G01S 19/39* | (2010.01) |
| *H04W 56/00* | (2009.01) |
| *G01S 19/42* | (2010.01) |

(52) U.S. Cl.
CPC ............. *G01S 19/23* (2013.01); *G01S 19/39* (2013.01); *G01S 19/42* (2013.01); *H04W 56/006* (2013.01)

(58) Field of Classification Search
CPC .......... G01S 19/23; G01S 19/02; G01S 19/14; G01S 19/39; G01S 19/42; G04R 20/02; H04B 7/2684; H04W 56/006
See application file for complete search history.

(56) References Cited

U.S. PATENT DOCUMENTS

| | | | |
|---|---|---|---|
| 2014/0266884 A1* | 9/2014 | Raghupathy | H04W 56/00 342/357.63 |
| 2016/0274243 A1 | 9/2016 | Maki et al. | |
| 2017/0052260 A1* | 2/2017 | Ramamurthy | G01S 19/23 |
| 2017/0315239 A1* | 11/2017 | Chiu | G01S 19/28 |

FOREIGN PATENT DOCUMENTS

| | | |
|---|---|---|
| JP | 06-034738 A | 2/1994 |
| JP | 2010-068065 A | 3/2010 |
| JP | 2016-173326 A | 9/2016 |

* cited by examiner

*Primary Examiner* — Erin F Heard
*Assistant Examiner* — Donald H B Braswell
(74) *Attorney, Agent, or Firm* — Harness, Dickey & Pierce, P.L.C.

(57) ABSTRACT

A timing signal output device includes a receiver configured to output a reference signal on the basis of satellite signals received from a plurality of positioning satellites, an oscillator configured to output a clock signal, and a processor configured to switch, on the basis of statistical value information concerning a statistical value obtained by performing statistical processing of elevation angles of the plurality of positioning satellites, a first mode for generating a timing signal based on the reference signal and a second mode for generating a timing signal based on the clock signal.

8 Claims, 8 Drawing Sheets

TIMING SIGNAL OUTPUT DEVICE, AND ELECTRONIC APPARATUS

CROSS-REFERENCE TO RELATED APPLICATIONS

This application claims priority to Japanese Patent Application No. 2017-035563, filed Feb. 27, 2017, the entirety of which is hereby incorporated by reference.

BACKGROUND

1. Technical Field

The present invention relates to a timing signal output device, and an electronic apparatus.

2. Related Art

There has been known a timing signal output device that generates a high-precision timing signal using time information included in satellite signals received from positioning satellites and outputs the high-precision timing signal (see, for example, JP-A-2016-173326). For example, as disclosed in JP-A-2016-173326, such a timing signal output device includes a GPS receiver that receives satellite signals transmitted from GPS (Global Positioning System) satellites and generates 1PPS (1 Pulse Per Second) and an oscillator that outputs a clock signal. The timing signal output device synchronizes the clock signal output from the oscillator with the 1PPS output from the GPS receiver and generates a timing signal (1PPS).

The timing signal output device described in JP-A-2016-173326 switches, on the basis of prior information indicating that precision of the 1PPS output from the GPS receiver is deteriorated, a state in which a timing signal based on the 1PPS output from the GPS receiver is output and a state in which a timing signal based on the clock signal output from the oscillator is output. In JP-A-2016-173326, DOP (Dilution Of Precision) information or the like indicating a degree of deterioration of precision of positioning based on the satellite signals received by the GPS receiver is used as the prior information.

However, in the timing signal output device described in JP-A-2016-173326, since the prior information used for the switching is an indicator of the positioning precision, the prior information sometimes does not reflect precision of the timing signal. Therefore, depending on a reception state of the satellite signal, accurate switching cannot be performed and the precision of the timing signal to be output is deteriorated.

SUMMARY

An advantage of some aspects of the invention is to provide a timing signal output device that can reduce precision deterioration of a timing signal and provide an electronic apparatus and a vehicle including the timing signal output device.

The invention can be implemented as the following application examples or forms.

A timing signal output device according to an application example includes: a receiver configured to output a reference signal on the basis of satellite signals received from a plurality of positioning satellites; an oscillator configured to output a clock signal; and a processor configured to switch, on the basis of statistical value information concerning a statistical value obtained by performing statistical processing of elevation angles of the plurality of positioning satellites, a first mode for generating a timing signal based on the reference signal and a second mode for generating a timing signal based on the clock signal.

The timing signal output device switches, on the basis of the statistical value information concerning the statistical value obtained by performing the statistical processing of the elevation angles of the plurality of positioning satellites, the first mode for generating the timing signal based on the reference signal output from the receiver and the second mode for generating the timing signal based on the clock signal output from the oscillator. Consequently, it is possible to reduce precision deterioration of the timing signal. This is because there is a relatively high correlation between precision of the reference signal output from the receiver and the statistical value of the elevation angles of the plurality of positioning satellites that transmit a plurality of satellite signals on which the reference signal is based.

In the timing signal output device according to the application example, it is preferable that the statistical value is any one of an average of the elevation angles of the plurality of positioning satellites, a median of the elevation angles of the plurality of positioning satellites, and a mode of the elevation angles of the plurality of positioning satellites.

With this configuration, it is possible to more accurately perform the switching of the first mode and the second mode.

It is preferable that the timing signal output device according to the application example includes a storage in which the statistical value information or information used for generation of the statistical value information is stored in advance.

With this configuration, it is possible to prepare the statistical value information in advance. Therefore, for example, it is possible to predictively perform the switching of the first mode and the second mode using the statistical value information stored in the storage.

In the timing signal output device according to the application example, it is preferable that the processor switches the first mode to the second mode when the statistical value is equal to or smaller than a threshold.

When the statistical value is equal to or smaller than the threshold, precision of the reference signal output from the receiver tends to be low. Therefore, by selecting the second mode when the statistical value is equal to or smaller than the threshold, it is possible to reduce precision deterioration of the timing signal.

In the timing signal output device according to the application example, it is preferable that the receiver outputs elevation angle information concerning the elevation angles of the plurality of positioning satellites, and the processor acquires the statistical value information using the elevation angle information.

With this configuration, it is possible to acquire the statistical value information using the elevation angle information concerning the positioning satellites from which the receiver receives the satellite signals. Therefore, it is possible to acquire statistical value information corresponding to a setting environment of the receiver. Therefore, it is possible to reduce precision deterioration of the timing signal due to the setting environment.

In the timing signal output device according to the application example, it is preferable that an elevation angle mask is set in the receiver, and the statistical value information is information concerning a statistical value obtained by performing statistical processing of elevation angles of the plurality of positioning satellites located at elevation angles equal to or larger than a set elevation angle of the elevation angle mask.

With this configuration, it is possible to use the statistical value information corresponding to the setting of the elevation angle mask of the receiver. Therefore, it is possible to improve a correlation between precision of the reference signal output from the receiver and the statistical value of the statistical value information. Therefore, it is possible to accurately perform the switching of the first mode and the second mode.

In the timing signal output device according to the application example, it is preferable that the receiver performs statistical processing of times acquired from a plurality of satellite signals received from the plurality of positioning satellites to generate the reference signal.

With this configuration, for example, it is possible to further improve the correlation between the precision of the reference signal output from the receiver and the statistical value of the statistical value information than when any one of the plurality of positioning satellites is selected and the reference signal is generated. Therefore, it is possible to accurately perform the switching of the first mode and the second mode.

In the timing signal output device according to the application example, it is preferable that the processor includes: a synchronization circuit capable of synchronizing the clock signal with the reference signal and generating the timing signal, and a controller configured to switch an operation state of the synchronization circuit to either one of the first mode and the second mode on the basis of the statistical value information.

With this configuration, it is possible to perform, with a relatively simple configuration, the switching of the first mode and the second mode on the basis of the statistical value information.

An electronic apparatus according to an application example includes the timing signal output device according to the application example.

With such an electronic apparatus, it is possible to reduce precision deterioration of a timing signal of the timing signal output device. Therefore, it is possible to improve characteristics of the electronic apparatus using the timing signal output from the timing signal output device.

A vehicle according to an application example includes the timing signal output device according to the application example.

With such a vehicle, it is possible to reduce precision deterioration of a timing signal of the timing signal output device. Therefore, it is possible to improve characteristics of the vehicle using the timing signal output from the timing signal output device.

BRIEF DESCRIPTION OF THE DRAWINGS

The embodiments will be described with reference to the accompanying drawings, wherein like numbers reference like elements.

DESCRIPTION OF EXEMPLARY EMBODIMENTS

A timing signal output device, an electronic apparatus, and a vehicle according to the embodiments are explained in detail below with reference to embodiments shown in the accompanying drawings.

1. Timing Signal Output Device

First Embodiment

Figure 1:
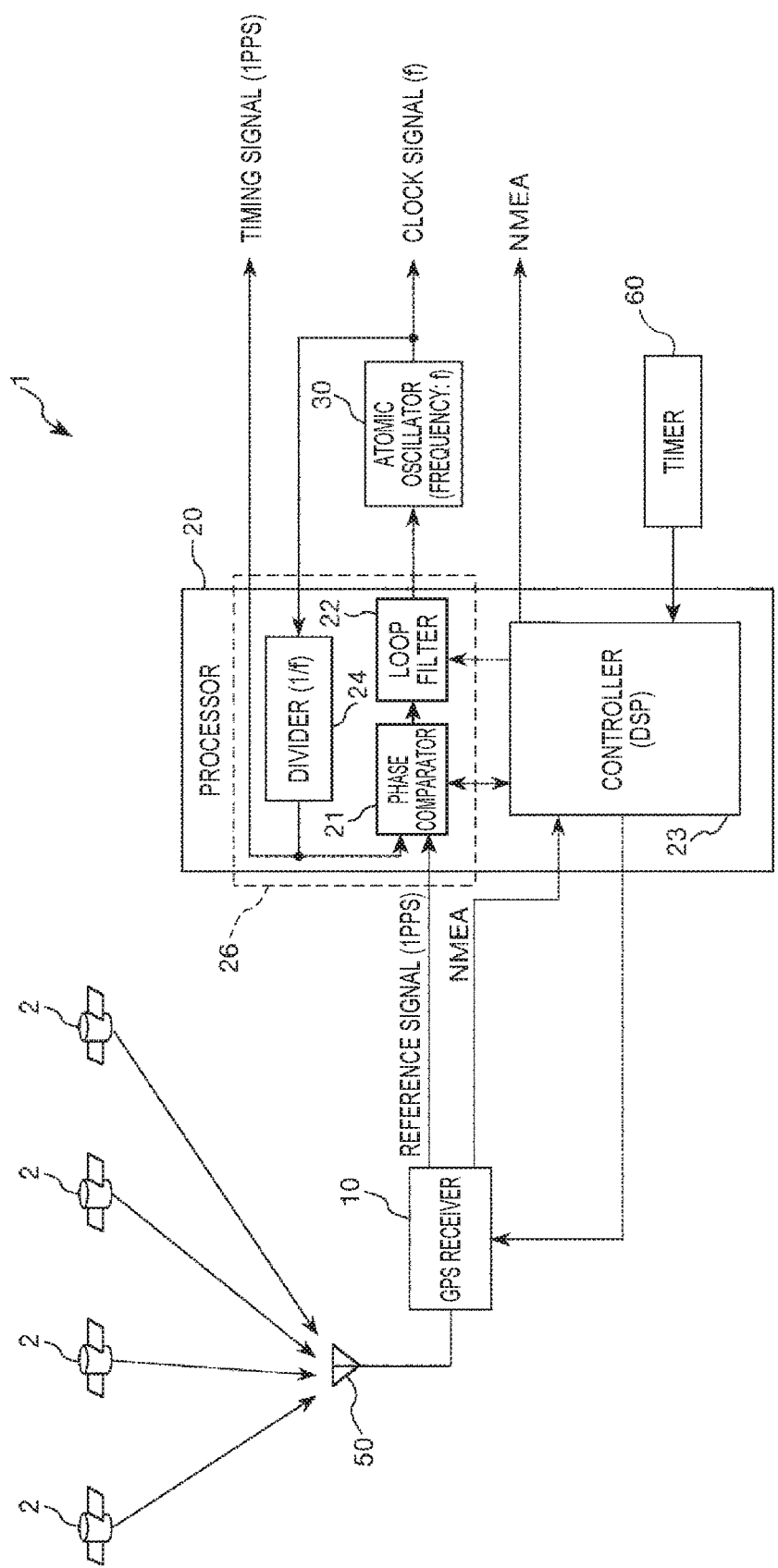
FIG. 1 is a diagram showing a schematic configuration example of a timing signal output device according to a first embodiment.

FIG. 1 is a diagram showing a schematic configuration example of a timing signal output device according to a first embodiment.

A timing signal output device 1 shown in FIG. 1 has a function of receiving satellite signals transmitted from GPS satellites 2 (an example of positioning satellites) and generating high-precision 1PPS as a timing signal. The timing signal output device 1 includes a GPS receiver 10 (a receiver), a processor 20, an atomic oscillator 30 (an oscillator), a GPS antenna 50, and a timer 60.

Note that a part or all of components of the timing signal output device 1 may be physically separated or may be integrated. For example, the GPS receiver 10 and the processor 20 may be respectively realized by separate ICs (Integrated Circuits) or may be realized as an IC of one chip.

The sections of the timing signal output device 1 are sequentially explained below.

GPS Receiver

The GPS receiver 10 (the receiver) has a function of performing various kinds of processing on the basis of satellite signals received via the GPS antenna 50.

Specifically, the GPS receiver 10 has a normal positioning mode and a position hold mode. The GPS receiver 10 is set to either one of the normal positioning mode and the position hold mode according to a control command output from the processor 20.

In the normal positioning mode, the GPS receiver 10 receives satellite signals transmitted from a plurality of (desirably, four or more) GPS satellites 2 and performs publicly-known positioning calculation on the basis of orbit information (specifically, Ephemeris data, Almanac data, etc.) and time information (specifically, week number data, Z count data, etc.) included in the received satellite signals. The normal positioning mode in this embodiment is a mode for continuously performing the positioning calculation at a predetermined interval such as once per second.

The GPS receiver 10 receives satellite signals transmitted from at least one GPS satellite 2 and generates 1PPS (1 Pulse Per Second) as a reference signal on the basis of orbit information and time information included in the received satellite signals and position information of a reception point set by the processor 20. The 1PPS is a pulse signal synchronized with a UTC (Universal Time Coordinate) and includes one pulse per second. Since the satellite signal used for the generation of the reference signal by the GPS receiver 10 includes the orbit information and the time information in this way, it is possible to generate a reference signal synchronized with reference time. The position hold mode is a mode for outputting the 1PPS using position information set in advance.

When generating the 1PPS, which is the reference signal, the GPS receiver 10 uses the satellite signals transmitted from at least one GPS satellite 2. When receiving a plurality of satellite signals, the GPS receiver 10 may perform statistical processing (e.g., averaging processing) of times based on the plurality of satellite signals and generate a reference signal corresponding to calculated one time (e.g., an average). When receiving one satellite signal, the GPS receiver 10 may perform statistical processing targeting the one satellite signal or may not perform the statistical processing. An elevation angle mask may be set in the GPS receiver 10. The GPS receiver 10 may generate a reference signal using satellite signals transmitted from the GPS satellites 2 present at elevation angles equal to or larger than a set elevation angle of the elevation angle mask. In general, the elevation angle mask is an angle set in the GPS receiver 10 such that signals transmitted from the GPS satellites 2 present at elevation angles smaller than the set elevation angle are not used.

Although not shown in FIG. 1, such a GPS receiver 10 includes, for example, a SAW (Surface Acoustic Wave) filter, a RF (Radio Frequency) processor, a baseband processor, and a temperature compensated crystal oscillator (TCXO). The SAW filter performs processing for extracting a satellite signal from a radio wave received by the GPS antenna 50. The RF processor generates a clock signal obtained by multiplying an oscillation signal of the TCXO and mixes the clock signal and the satellite signal to down-convert the clock signal to an intermediate frequency and thereafter performs AD (Analog to Digital) conversion of the clock signal and outputs the clock signal to the baseband processor. The baseband processor includes a DSP (Digital Signal Processor), a CPU (Central Processing Unit), an SRAM (Static Random Access Memory), and an RTC (Real Time Clock). The baseband processor performs various kinds of processing using the oscillation signal of the TCXO as the clock signal.

Processor

The processor 20 shown in FIG. 1 transmits various control commands to the GPS receiver 10 to control the operation of the GPS receiver 10, receives the 1PPS output by the GPS receiver 10 and data created in a format of an NMEA (National Marine Electronics Association) (hereinafter referred to as "NMEA data" as well", and performs various kinds of processing. The NMEA data includes various kinds of information such as positions (position information) calculated by the GPS receiver 10, times corresponding to the position, and elevation angles of the GPS satellites 2 used for the positioning calculation. The processor 20 may perform various kinds of processing according to computer programs stored in a storage (not shown in FIG. 1) inside the processor 20 or a storage (not shown in FIG. 1) connected to the processor 20.

The processor 20 is configured by, for example, a CPU, an MPU (Micro Processing Unit), a DSP (Digital Signal Processor), or an ASIC (Application Specific Integrated Circuit). The processor 20 in this embodiment includes, as shown in FIG. 1, a phase comparator 21, a loop filter 22, a controller 23 (DSP: Digital Signal Processor), and a divider 24.

The controller 23 performs processing for periodically (e.g., at every one second) acquiring NMEA data from the GPS receiver 10, collecting position information (results of the positioning calculation in the normal positioning mode by the GPS receiver 10) included in the NMEA data, creating statistical information in a predetermined period, and generating position information of a reception point on the basis of the statistical information. The controller 23 generates the position information of the reception point on the basis of, for example, an average, a mode, or a median of a plurality of positioning calculation results in the normal positioning mode by the GPS receiver 10.

The controller 23 has a function of controlling the operation of a synchronization circuit 26 on the basis of statistical value information, which is information concerning a statistical value obtained by performing, at every time, statistical processing of elevation angles of the plurality of GPS satellites 2 that transmitted a plurality of satellite signals used for generation of a reference signal in the GPS receiver 10 (hereinafter referred to as "elevation angle statistical value information of the GPS satellites 2". The statistical value information is information used for switching of a first mode and a second mode explained below. The statistical value information may be data of the statistical value itself or may be secondary data obtained by further processing the statistical value. The secondary data is, for example, a difference value between the statistical value and a threshold explained below, a magnitude relation between the statistical value and the threshold, acceptability of precision of the reference signal determined on the basis of the statistical value, necessity of switching of the first mode and the second mode explained below, and information for specifying a mode that should be adopted of the first mode and the second mode. The statistical value information may include information related to the statistical value and information for specifying the statistical value such as data of time corresponding to the statistical value. In this embodiment, the controller 23 acquires the statistical value information by performing statistical processing or the like of the statistical value acquired from the GPS receiver 10.

The controller 23 is capable of acquiring elevation angle statistical value information of the GPS satellites 2 on the basis of time information in the timer 60 and the elevation angle information (e.g., the elevation angle included in the NMEA data) output from the GPS receiver 10. The controller 23 may acquire the elevation angle statistical value information of the GPS satellites 2 on the basis of time information and the elevation angle information (e.g., the elevation angle and time included in the NMEA data) output from the GPS receiver 10.

The controller 23 is capable of switching (selecting), on the basis of the elevation angle statistical value information of the GPS satellites 2 acquired in this way, a first mode for performing synchronization processing in the synchronization circuit 26 (hereinafter simply referred to as "first mode" as well) and a second mode for stopping the synchronization processing in the synchronization circuit 26 (hereinafter simply referred to as "second mode" as well) explained below. In this embodiment, the controller 23 fixes an output signal (a voltage value) of the loop filter 22 to select the second mode. For example, when the statistical value information is data of the statistical value, the controller 23 compares a threshold explained below and the statistical value and switches the modes on the basis of a result of the comparison. Specifically, when the statistical value is equal to or smaller than the threshold, the controller 23 selects the second mode. When the statistical value is larger than the threshold, the controller 23 selects the first mode. When the statistical value information is secondary data, the controller 23 only has to perform determination or the switching of the modes according to content of the data. Note that the threshold may be stored in a not-shown storage. The controller 23 may perform such processing of the switching, for example, in every acquisition of NMEA data or may perform the processing at each predetermined time interval (e.g., one second or more and ten minutes or less). The controller 23 may determine whether a reception state of the GPS receiver 10 is satisfactory. When the reception state of the GPS receiver 10 is not satisfactory (e.g., a signal is weak, the signal cannot be received, or NMEA data at new time cannot be acquired), the controller 23 may stop or suspend the processing until the reception state becomes satisfactory and resume the processing when the reception state becomes satisfactory.

The first mode is a mode in which the processor 20 generates a timing signal on the basis of a reference signal output from the GPS receiver 10, that is, a synchronous mode in which the processor 20 outputs a timing signal synchronized with the reference signal output from the GPS receiver 10. The second mode is a mode in which the processor 20 generates a timing signal on the basis of a clock signal output from the atomic oscillator 30, that is, an asynchronous mode in which the processor 20 outputs a timing signal using a clock signal output from the atomic oscillator 30 free-running without being synchronized with the reference signal output from the GPS receiver 10.

The controller 23 transmits various control commands to the GPS receiver 10 and controls the operation of the GPS receiver 10. Specifically, the controller 23 performs processing for transmitting a control command for mode setting to the GPS receiver 10 and switching the GPS receiver 10 from the normal positioning mode to the position hold mode. The controller 23 performs processing for, before switching the GPS receiver 10 from the normal positioning mode to the position hold mode, transmitting a control command for position setting to the GPS receiver 10 and setting, in the GPS receiver 10, position information of a reception point generated by the controller 23 (a position of the GPS receiver 10 determined by the controller 23).

The divider 24 divides a clock signal (a frequency: f) output by the atomic oscillator 30 by a division ratio of 1/f and outputs a divided clock signal (a timing signal) of 1 Hz.

The phase comparator 21 performs phase comparison of the 1PPS (the reference signal) output by the GPS receiver 10 and the divided clock signal of 1 Hz (a signal based on the clock signal of the atomic oscillator 30) output by the divider 24 and outputs a phase difference signal having a voltage value corresponding to a phase difference as a result of the comparison. The phase difference signal is input to the atomic oscillator 30 via the loop filter 22. Parameters of the loop filter 22 are set by the controller 23.

The divided clock signal of 1 Hz output by the divider 24 is synchronized with the 1PPS output by the GPS receiver 10. The timing signal output device 1 outputs the divided clock signal to the outside as 1PPS with extremely high frequency precision synchronized with the UTC. The timing signal output device 1 outputs latest NMEA data to the outside at every second in synchronization with the 1PPS.

The atomic oscillator 30 is configured to be capable of finely adjusting a frequency according to an output voltage (a control voltage) of the loop filter 22. As explained above, by the phase comparator 21, the loop filter 22, and the divider 24, the clock signal output by the atomic oscillator 30 is completely synchronized with the 1PPS output by the GPS receiver 10. That is, the phase comparator 21, the loop filter 22, and the divider 24 configure the synchronization circuit 26 and synchronize the clock signal output by the atomic oscillator 30 with the 1PPS output from the GPS receiver 10. Consequently, it is possible to output the clock signal output from the atomic oscillator 30 as a high-precision timing signal synchronized with the 1PPS output from the GPS receiver 10.

When a situation occurs in which the GPS receiver 10 cannot receive satellite signals or a reception environment is bad, precision of the 1PPS output by the GPS receiver 10 is deteriorated or the GPS receiver 10 stops the output of the 1PPS. In such a case, the processor 20 stops the processing for synchronizing the clock signal output by the atomic oscillator 30 with the 1PPS output by the GPS receiver 10 (the synchronization processing by the synchronization circuit 26) and causes the atomic oscillator 30 to perform free-running oscillation (hold-over). Consequently, even when the precision of the 1PPS output by the GPS receiver 10 is deteriorated, the timing signal output device 1 can output 1PPS with high frequency precision by the free-running oscillation of the atomic oscillator 30. In this way, for example, even in a situation in which the GPS receiver 10 cannot output a reference signal, the timing signal output device 1 can generate a high-precision timing signal by using the clock signal output from the atomic oscillator 30.

Atomic Oscillator (Oscillator)

The atomic oscillator 30 shown in FIG. 1 is an oscillator capable of outputting a clock signal with high frequency precision using energy transition of atoms such as rubidium atoms or cesium atoms. As the atomic oscillator 30, it is possible to use, for example, an atomic oscillator of a type using an EIT (Electromagnetically Induced Transparency) phenomenon (called CPT (Coherent Population Trapping) phenomenon as well) or an atomic oscillator of a type using an optical micro double resonance phenomenon.

Note that it is possible to output the 1PPS by the free-running oscillation when a crystal oscillator such as an OCXO (Oven Controlled Crystal Oscillator) of a double oven or a single oven, a VCXO (Voltage Controlled Crystal Oscillator), or a TCXO (Temperature Compensated Crystal Oscillator) is used instead of the atomic oscillator 30.

Timer

The timer 60 is a real-time clock having a function of generating time information. The timer 60 is counted up by, for example, a clock signal output from a not-shown crystal oscillator with temperature compensated circuit (TCXO). Note that the timer 60 may be provided in the GPS receiver 10.

The configuration of the timing signal output device 1 is briefly explained above. As explained above, the timing signal output device 1 includes the GPS receiver 10, which is the receiver that output a reference signal (1PPS) on the basis of satellite signals received from the GPS satellites 2, which are the plurality of positioning satellites, the atomic oscillator 30, which is the oscillator that outputs a clock signal, and the processor 20 that switches the first mode for generating a timing signal based on the reference signal output from the GPS receiver 10 and the second mode for generating a timing signal based on the clock signal output from the atomic oscillator 30. The switching of the first mode and the second mode is explained below.

Switching of the First Mode and the Second Mode

Figure 2:
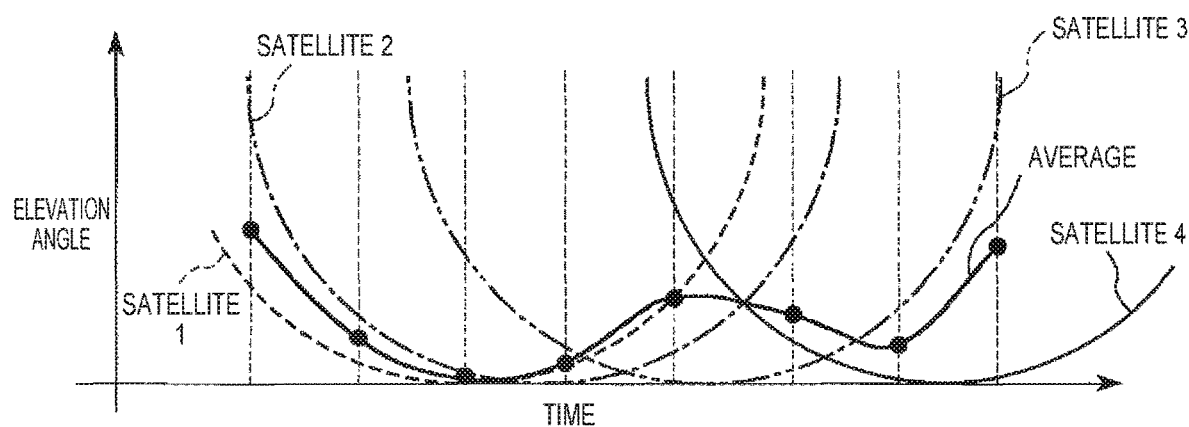
FIG. 2 is a graph showing a change over time of elevation angles of a plurality of GPS satellites.
Figure 3:
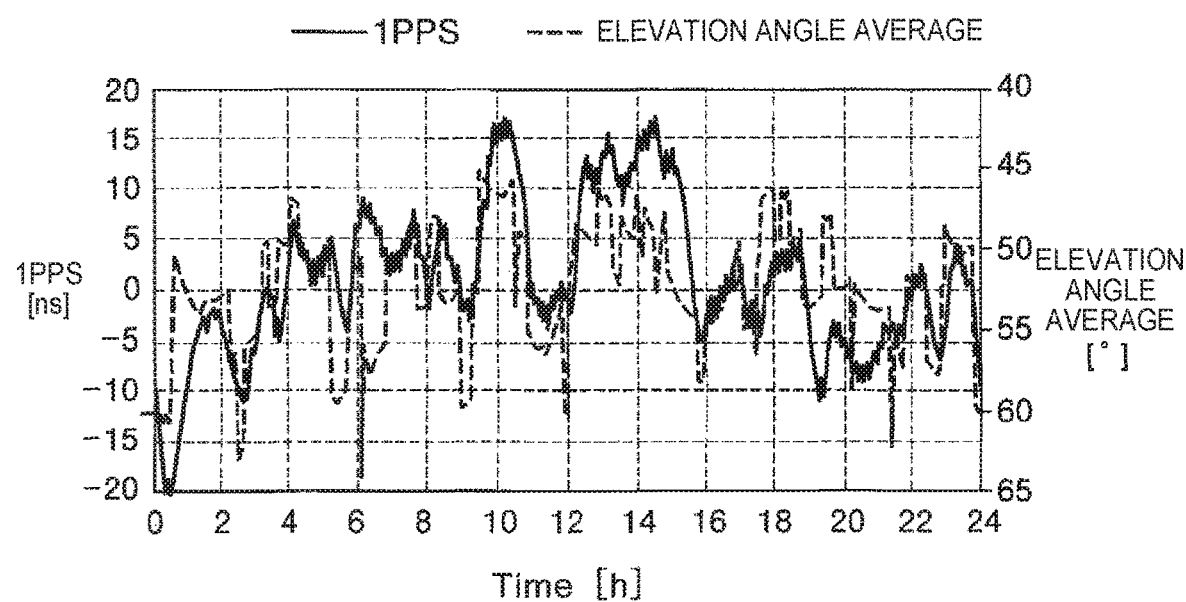
FIG. 3 is a graph showing changes over time of an elevation angle average of the plurality of GPS satellites and precision (an error) of a reference signal (1PPS) output from a GPS receiver.
Figure 4:
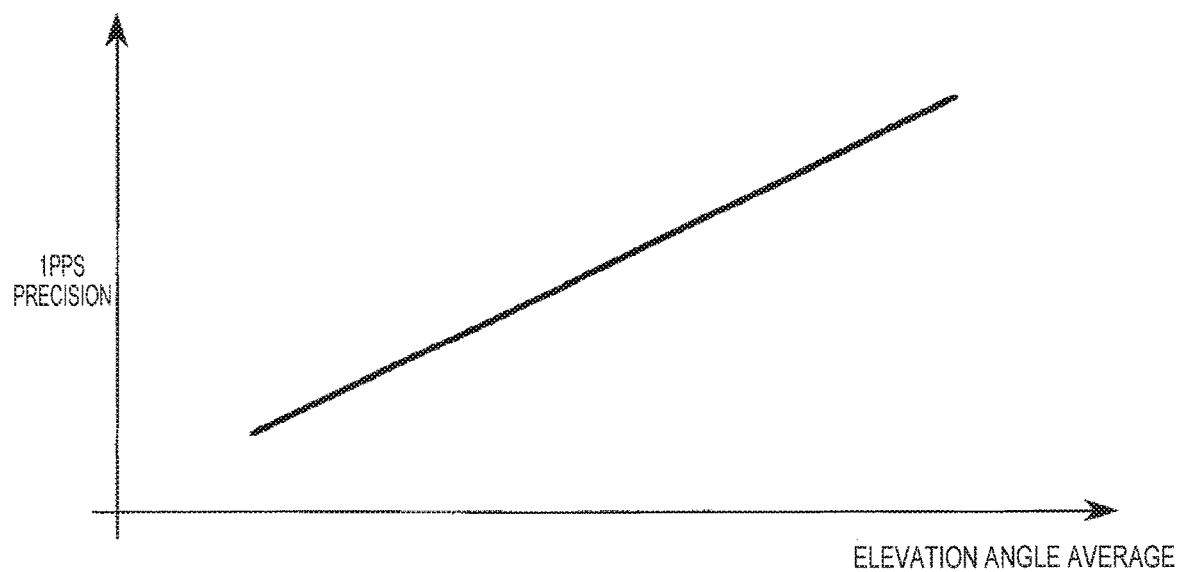
FIG. 4 is a graph showing a relation between the elevation angle average of the plurality of GPS satellites and the precision of the reference signal (1PPS).
Figure 5:
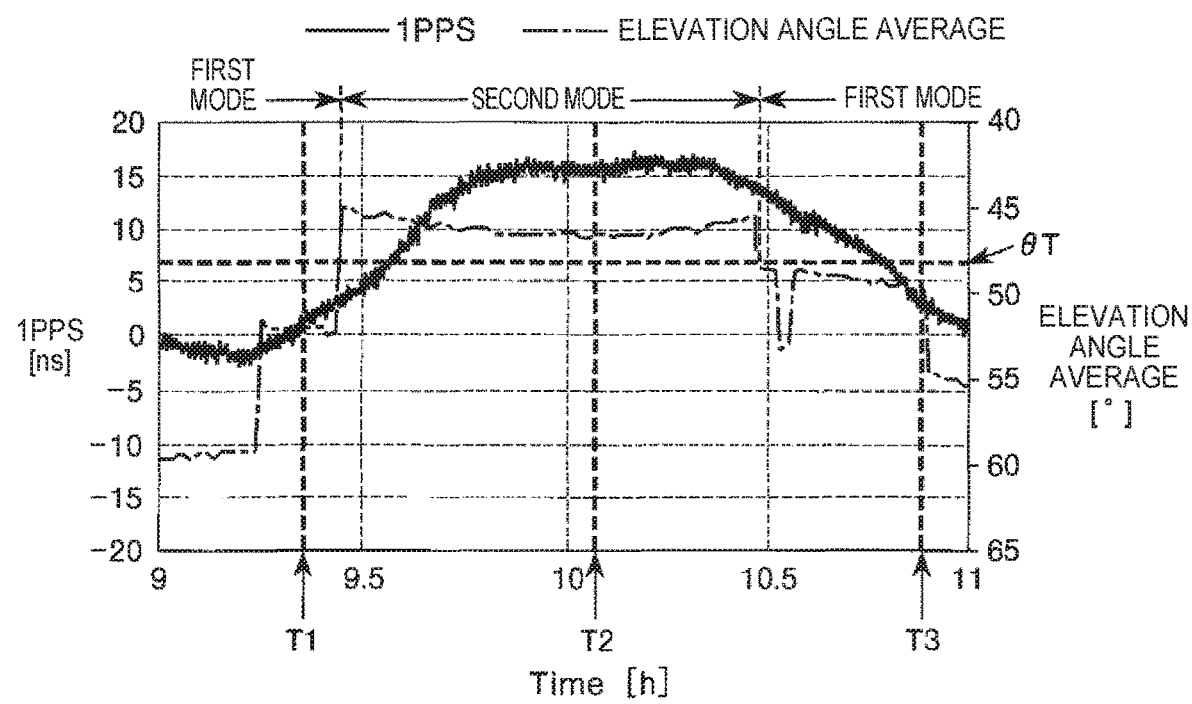
FIG. 5 is a graph for explaining switching of a first mode and a second mode based on the elevation angle average of the plurality of GPS satellites and is a graph showing changes over time of the elevation angle average of the plurality of GPS satellites and the precision (the error) of the reference signal (1PPS) output from the GPS receiver.
Figure 6:
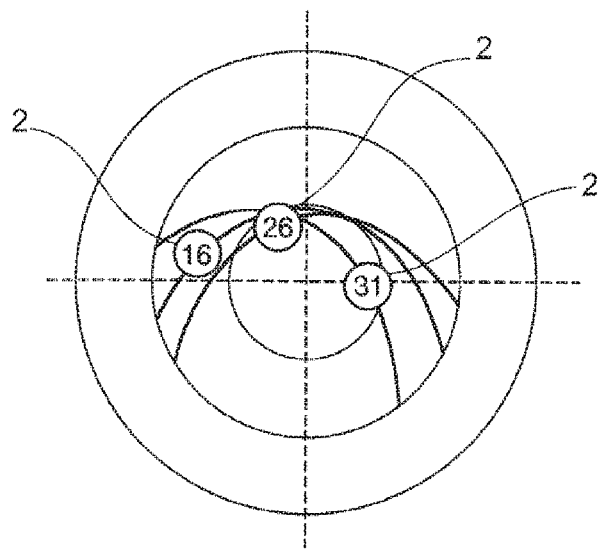
FIG. 6 is a diagram showing an example of disposition of a plurality of positioning satellites at time T1 in FIG. 5.
Figure 7:
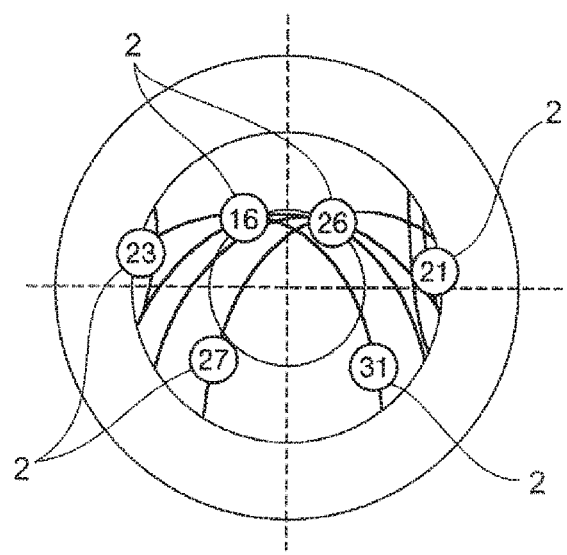
FIG. 7 is a diagram showing an example of disposition of the plurality of positioning satellites at time T2 in FIG. 5.
Figure 8:
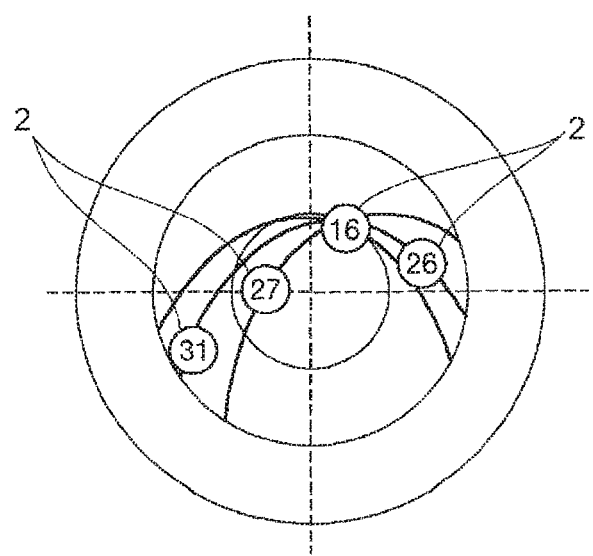
FIG. 8 is a diagram showing an example of disposition of the plurality of positioning satellites at time T3 in FIG. 5.
Figure 9:
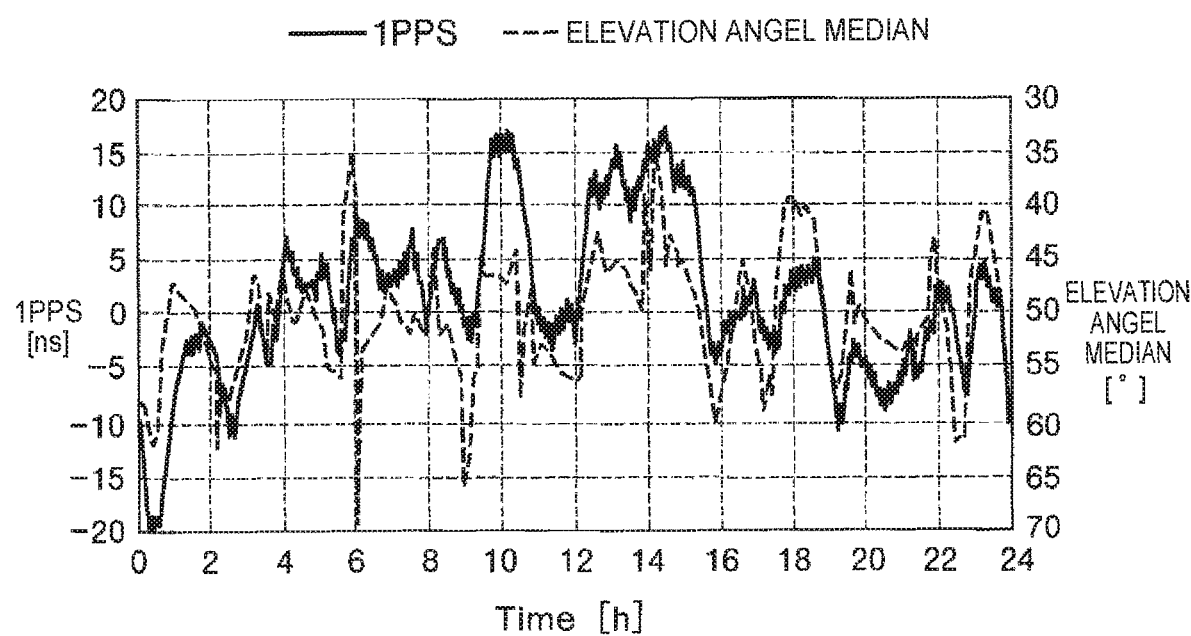
FIG. 9 is a graph showing changes over time of an elevation angle median of the plurality of GPS satellites and the precision of the reference signal (1PPS) output from the GPS receiver.

FIG. 2 is a graph showing a change over time of elevation angles of a plurality of GPS satellites. FIG. 3 is a graph showing changes over time of an elevation angle average of the plurality of GPS satellites and precision (an error) of a reference signal (1PPS) output from the GPS receiver. FIG. 4 is a graph showing a relation between the elevation angle average of the plurality of GPS satellites and the precision of the reference signal (1PPS). FIG. 5 is a graph for explaining the switching of the first mode and the second mode based on the elevation angle average of the plurality of GPS satellites and is a graph showing changes over time of the elevation angle average of the plurality of GPS satellites and the precision (the error) of the reference signal (1PPS) output from the GPS receiver. FIG. 6 is a diagram showing an example of disposition of a plurality of positioning satellites at time T1 in FIG. 5. FIG. 7 is a diagram showing an example of disposition of the plurality of positioning satellites at time T2 in FIG. 5. FIG. 8 is a diagram showing an example of disposition of the plurality of positioning satellites at time T3 in FIG. 5. FIG. 9 is a graph showing changes over time of an elevation angle median of the plurality of GPS satellites and the precision of the reference signal (1PPS) output from the GPS receiver.

Note that the vertical axis (1PPS) shown in FIGS. 3 and 5 indicates an error of the reference signal (1PPS) and indicates that precision is worse as the absolute value of a numerical value is larger. The vertical axis (1PPS precision) shown in FIG. 4 indicates that precision is better as the distance from an intersection with the horizontal axis is longer (further on the upper side in FIG. 4).

The GPS receiver 10 included in the timing signal output device 1 usually receives a plurality of satellite signals from the plurality of GPS satellites 2 and generates a reference signal (1PPS) using the plurality of satellite signals. Elevation angles of the plurality of GPS satellites 2 that transmit the plurality of satellite signals used by the GPS receiver 10 for the generation of the reference signal change according to time, for example, as shown in FIG. 2.

The inventors obtained knowledge that, as shown in FIG. 3, there is a correlation between a statistical value (in FIG. 3, an average) obtained by performing statistical processing of the elevation angles of the plurality of GPS satellites that transmit the plurality of satellite signals used by the GPS receiver 10 for the generation of the reference signal and precision of the reference signal (1PPS) output from the GPS receiver 10. A tendency that the error of the 1PPS decreases when the elevation angle average increases and the error of the 1PPS increases when the elevation angle average decreases is read from FIG. 3. As shown in FIG. 4, as such a statistical value (in FIG. 4, the elevation angle average) increases, the precision of the reference signal output from the GPS receiver 10 is higher (better). In this way, there is a relatively high correlation between the precision of the reference signal output from the GPS receiver 10 and the statistical value of the elevation angles of the plurality of GPS satellites 2 that transmit the plurality of satellite signals on which the reference signal is based.

Therefore, as explained above, the processor 20 included in the timing signal output device 1 switches, on the basis of statistical value information concerning a statistical value obtained by performing statistical processing of the elevation angles of the plurality of GPS satellites 2 (hereinafter simply referred to as "statistical value" as well) (hereinafter simply referred to as "statistical value information" as well), the first mode for generating a timing signal based on the reference signal output from the GPS receiver 10 and the second mode for generating a timing signal based on the clock signal output from the atomic oscillator 30. Consequently, for example, it is possible to select the first mode and output a high-precision timing signal when the precision of the reference signal output from the GPS receiver 10 is high and select the second mode and reduce precision deterioration of the timing signal when the precision of the reference signal output from the GPS receiver 10 is low.

As explained above, the processor 20 includes the synchronization circuit 26 capable of synchronizing the clock signal output from the atomic oscillator 30 with the reference signal output from the GPS receiver 10 and generating a timing signal and the controller 23 configured to switch an operation state of the synchronization circuit 26 to either one of the first mode and the second mode on the basis of the statistical value information. Consequently, it is possible to perform, with a relatively simple configuration, the switching of the first mode and the second mode on the basis of the statistical value information.

More specifically, the controller 23 determines whether an elevation angle statistical value (in FIG. 5, an elevation angle average indicated by an alternate long and short dash line) of the plurality of GPS satellites 2 is equal to or smaller than a threshold θT as shown in FIG. 5. When the elevation angle statistical value is equal to or smaller than the threshold θT, the controller 23 selects the second mode. When the elevation angle statistical value exceeds the threshold θT, the controller 23 selects the first mode. Note that, in FIG. 5, a numerical value of the vertical axis (the elevation angle average) on the right side increases from the upper side toward the lower side in FIG. 5 (as the numerical value is closer to the horizontal axis (time)). Therefore, when the elevation angle statistical value is equal to or smaller than the threshold θT, in FIG. 5, the elevation angle average is equal to the threshold θT or is present on the upper side with respect to the threshold θT. When the elevation angle statistical value exceeds the threshold θT, in FIG. 5, the elevation angle average is present on the lower side with respect to the threshold θT.

In this way, when the statistical value is equal to or smaller than the threshold, the processor 20 switches the first mode to the second mode. When the statistical value is equal to or smaller than the threshold, precision of the reference signal output from the GPS receiver 10 tends to be low. Therefore, when the statistical value is equal to or smaller than the threshold, it is possible to reduce precision deterioration of the timing signal by selecting the second mode.

The GPS receiver 10 (the receiver) performs statistical processing of times acquired from the plurality of satellite signals received from the plurality of GPS satellites 2 (the positioning satellites) to generate a reference signal. Consequently, it is possible to further improve a correlation between the precision of the reference signal output from the GPS receiver 10 and the statistical value of the statistical value information than, for example, when any one of the plurality of GPS satellites 2 is selected to generate the reference signal. Therefore, it is possible to accurately perform the switching of the first mode and the second mode.

FIGS. 6 to 8 are schematic diagrams showing dispositions of the positioning satellites. Elevation angles are higher in positions closer to the center of circles. Three concentric circles are respectively lines indicating certain elevation angles. Solid lines other than the concentric circles schematically represent orbits of the GPS satellites 2. For example, at times T1, T2, and T3 in FIG. 5, as shown in FIGS. 6 to 8, the number of GPS satellites 2 (No. 26 and No. 31 in FIG. 6, No. 16 and No. 26 in FIG. 7, and No. 16 and No. 27 in FIG. 8) present at high elevation angles is the same. However, the number of GPS satellites 2 (No. 21, No. 23, No. 27, and No. 31 in FIG. 7) present at low elevation angles at time T2 in FIG. 5 is larger than the number of GPS satellites 2 (No. 16 in FIG. 6 and No. 26 and No. 31 in FIG. 8) present at low elevation angles at times T1 and T3 in FIG. 5. Therefore, a statistical value (in FIG. 5, an average) at time T2 in FIG. 5 is smaller than statistical values (in FIG. 5, averages) at times T1 and T3 in FIG. 5. In general, precision of a timing signal is deteriorated when satellite signals transmitted from the GPS satellites 2 at low elevation angles are used. From FIGS. 5 to 8, it is considered that, at time T2, since the number of GPS satellites 2 at the low elevation angles is large compared with that at time T1 and the like, the influence of the GPS satellites 2 at the low elevation angles increases and the precision of the reference signal is deteriorated. Since the number of GPS satellites 2 at the low elevation angles is reflected on the statistical value, by using such a statistical value, it is possible to more accurately perform the switching of the first mode and the second mode.

An elevation angle mask is set in the GPS receiver (the receiver). The statistical value information is information concerning a statistical value obtained by performing statistical processing of elevation angles of a plurality of GPS satellites 2 (positioning satellites) located at elevation angles equal to or larger than a set elevation angle of the elevation angle mask. Consequently, since it is possible to use statistical value information corresponding to the setting of the elevation angle mask of the GPS receiver 10, it is possible to improve the correlation between the precision of the reference signal output from the GPS receiver and the statistical value of the statistical value information. Therefore, it is possible to accurately perform the switching of the first mode and the second mode. Note that the statistical value may be a statistical value obtained by performing statistical processing of elevation angles of all of a plurality of GPS satellites 2 (positioning satellites), satellite signals of which can be received by the GPS receiver 10.

The statistical value used for the determination of the switching of the first mode and the second mode by the processor 20 is desirably any one of an average of the elevation angles of the plurality of GPS satellites 2 (positioning satellites), a median of the elevation angles of the plurality of GPS satellites 2 (positioning satellites), and a mode of the elevation angles of the plurality of GPS satellites 2 (positioning satellites). Consequently, it is possible to more accurately perform the switching of the first mode and the second mode. For example, as shown in FIG. 9, it is seen that, when the median is used as the statistical value, there is a correlation between the statistical value and the precision of the reference signal as in the case in which the average is used as the statistical value as shown in FIG. 3.

The GPS receiver 10 (the receiver) outputs elevation angle information (e.g., elevation angle information included in NMEA data) concerning the elevation angles of the plurality of GPS satellites 2 (positioning satellites). The processor 20 acquires statistical value information using the elevation angle information. Consequently, it is possible to acquire statistical value information corresponding to a setting environment. Therefore, it is possible to accurately perform the switching of the first mode and the second mode according to the setting environment. For example, when it is hard to receive a satellite signal from a certain direction because of buildings around a place where the GPS receiver 10 is set, it is possible to use elevation angle information of the GPS satellites 2, satellite signals of which are actually received by the GPS receiver 10. Therefore, it is possible to more appropriately perform the switching of the first mode and the second mode than when an actual reception state is not taken into account.

Second Embodiment

Figure 10:
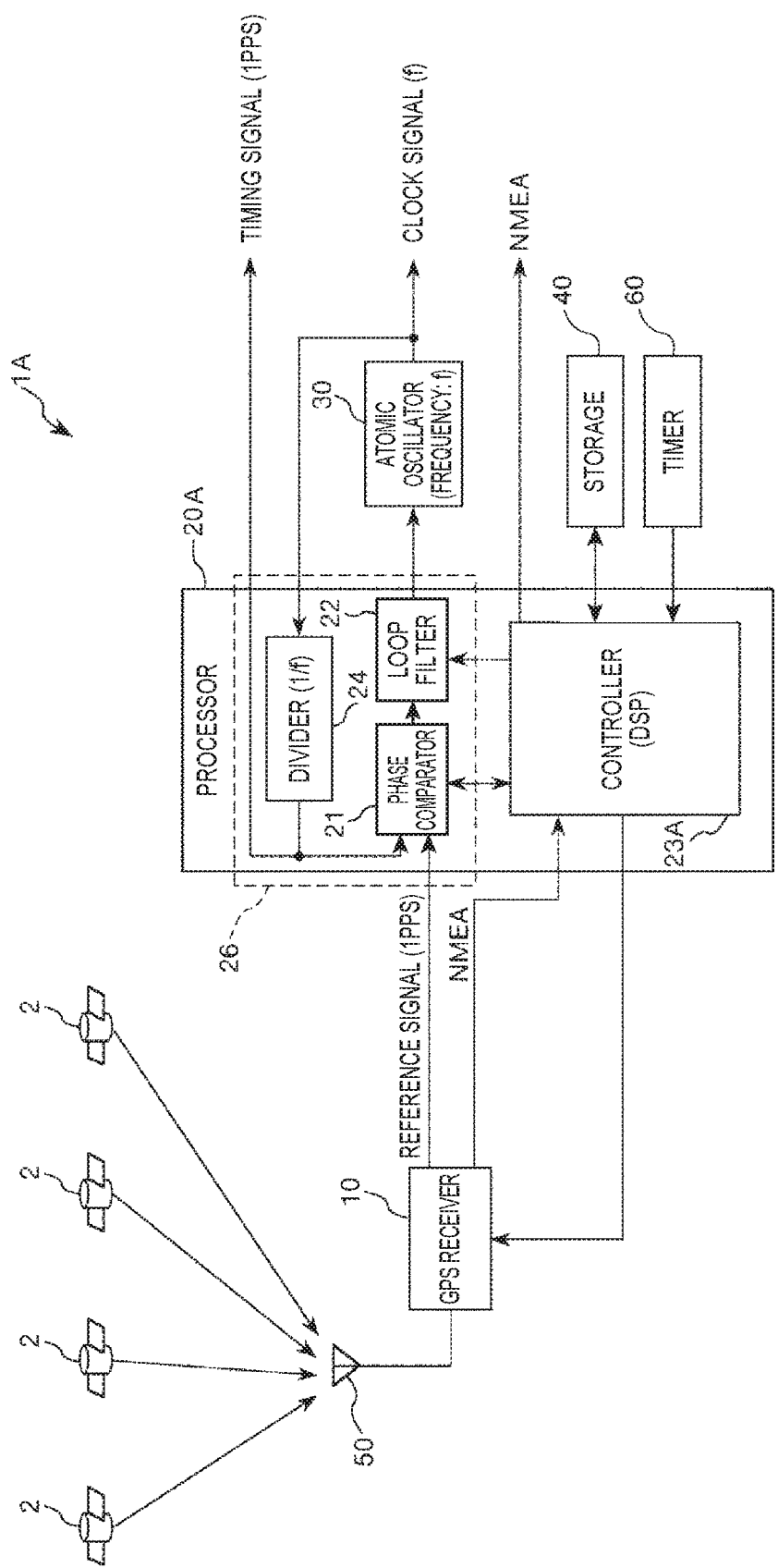
FIG. 10 is a diagram showing a schematic configuration example of a timing signal output device according to a second embodiment.

FIG. 10 is a diagram showing a schematic configuration example of a timing signal output device according to a second embodiment.

This embodiment is the same as the first embodiment except that the switching of the first mode and the second mode is performed using statistical value information stored in a storage. Note that, in the following explanation, concerning the second embodiment, differences from the first embodiment are mainly explained. Explanation of similarities to the first embodiment is omitted. In FIG. 10, the same components as the components in the first embodiment are denoted by the same reference numerals and signs.

A timing signal generating device 1A shown in FIG. 10 includes the GPS receiver 10 (a receiver), a processor 20A, the atomic oscillator 30 (an oscillator), a storage 40, the GPS antenna 50, and the timer 60.

The processor 20A includes the phase comparator 21, the loop filter 22, a controller 23A, and the divider 24. The controller 23A acquires elevation angle statistical value information of the GPS satellites 2 from the storage 40 and switches the first mode and the second mode on the basis of the acquired elevation angle statistical value information of the GPS satellites 2.

Statistical value information is stored in the storage 40. The statistical value information is information concerning a statistical value obtained by performing, at every time, statistical processing of elevation angles of the plurality of GPS satellites 2 that transmit a plurality of satellite signals used for generation of a reference signal in the GPS receiver 10. In FIG. 10, the storage 40 is provided as a body separate from the processor 20A. However, the storage may be incorporated in the processor 20A (e.g., the controller 23A). The storage 40 is not particularly limited. For example, a nonvolatile memory or a volatile memory can be used.

The statistical value information stored in the storage 40 is desirably, for example, information at every time of a time interval equal to or longer than one second and equal to or shorter than ten minutes. However, the time interval may be set longer than ten minutes according to necessity or may be set or changed from the outside via a not-shown interface (e.g., a terminal, a user interface, or a wireless communication device). The statistical value information stored in the storage 40 may be periodically updated at every several hours or in every several days or may be irregularly updated according to necessity. For example, the controller 23A may be capable of storing, in the storage 40, elevation angle statistical value information acquired on the basis of time information of the timer 60 or NMEA data and elevation angle information output from the GPS receiver 10. The statistical value information may be created by the processor 20A or may be created by an external device capable of communicating with the timing signal output device via the interface.

The statistical value information stored in the storage 40 may be the statistical value itself or may be secondary data obtained by further processing the statistical value as in the first embodiment. Such statistical value information can be calculated using information (elevation angles of the GPS satellites 2, Ephemeris of the GPS satellites 2, positions of the GPS satellites 2 at respective times, etc.) output from the GPS receiver 10. Therefore, for example, the controller 23A calculates statistical value information in future from the present time using information output from the GPS receiver 10 and stores a result of the calculation (statistical value information) in the storage 40 in advance. "In advance" only has to mean time before the GPS satellites 2 are actually disposed in certain satellite disposition.

The controller 23A performs, using statistical value information stored in the storage 40, processing corresponding to content of the statistical value information and performs the switching of the first mode and the second mode. For example, when the statistical value information stored in the storage 40 is a statistical value itself of elevation angles of the GPS satellites 2, as explained in the first embodiment, the controller 23A performs comparison of the statistical value and the threshold and performs the switching of the first mode and the second mode on the basis of a result of the comparison. When the statistical value information stored in the storage 40 is information after the comparison (a comparison result of a magnitude relation or the like), the controller 23A selects the mode (the first mode or the second mode) corresponding to the information.

Note that the GPS satellites 2 set as targets of statistics of the statistical value information are satellites set as reception targets of the GPS receiver 10 at determination time of the switching of the first mode and the second mode, for example, the GPS satellites 2 that become visible satellites or the GPS satellites 2 having elevation angles equal to or larger than a predetermined elevation angle among the GPS satellites 2 that become the visible satellites. The device (the controller 23A (the processor 20A) or the external device) that creates the statistical value information is capable of acquiring and using the position of the GPS receiver 10 and setting of an elevation angle mask according to necessity. At certain time, the GPS satellites 2, from which the GPS receiver 10 actually receives signals, and satellites used in the statistical value information obtained using the storage 40 may completely coincide or may be partially different (the GPS satellites 2 not included in either one of the GPS satellites 2 or the satellites or the GPS satellites 2 included in only one of the GPS satellites 2 and the satellites).

In this way, the timing signal output device 1 includes the storage 40 in which the statistical value information is stored in advance. Consequently, it is possible to prepare the statistical value information in advance. Therefore, for example, it is possible to predictively perform the switching of the first mode and the second mode using the statistical value information stored in the storage 40.

According to the second embodiment explained above, it is also possible to reduce the precision deterioration of the timing signal.

Third Embodiment

Figure 11:
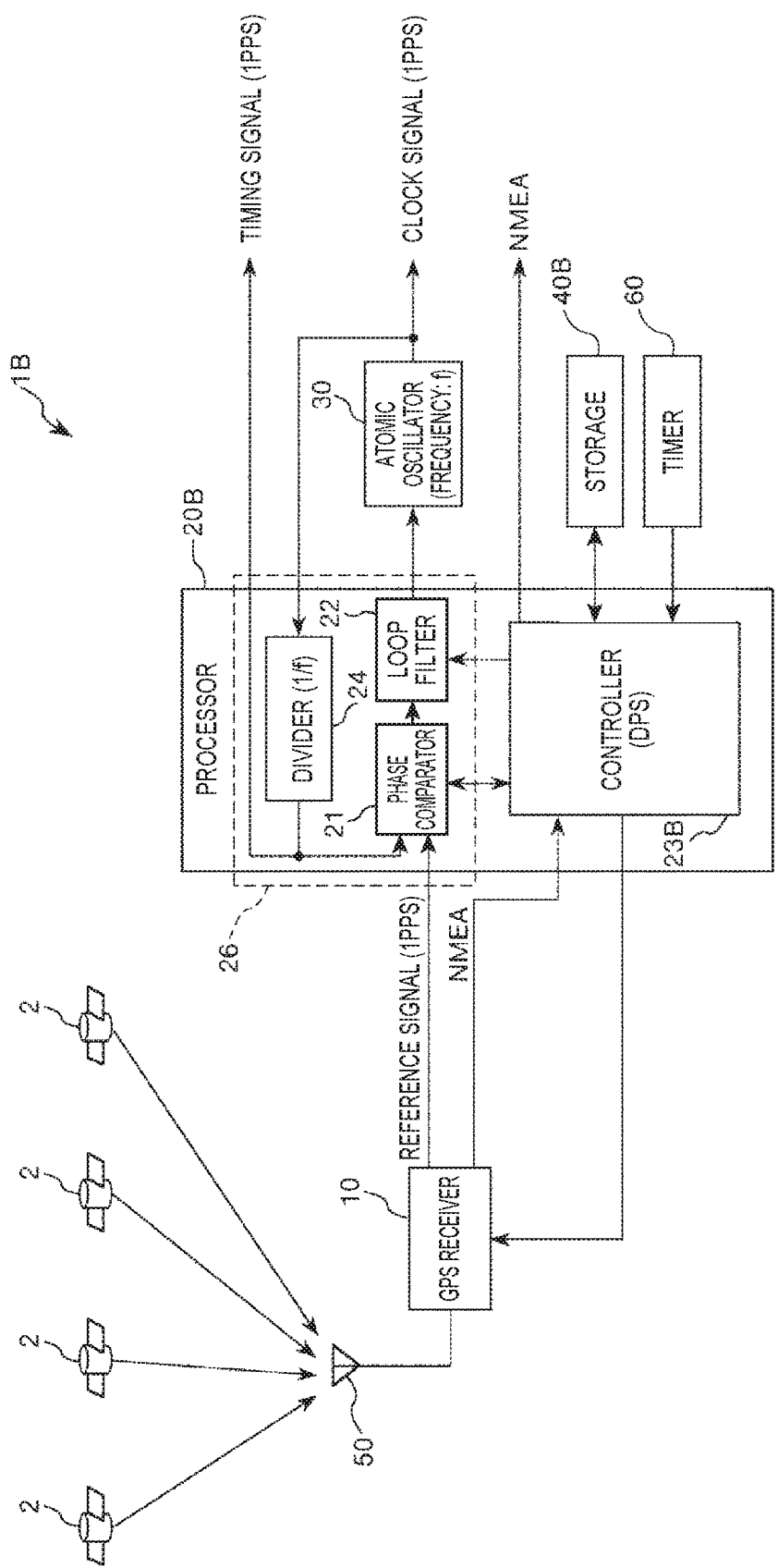
FIG. 11 is a diagram showing a schematic configuration example of a timing signal output device according to a third embodiment.

FIG. 11 is a diagram showing a schematic configuration example of a timing signal output device according to a third embodiment.

This embodiment is the same as the first embodiment except that statistical value information is calculated using information stored in a storage and the switching of the first mode and the second mode is performed using a result of the calculation. Note that, in the following explanation, concerning the third embodiment, differences from the embodiments explained above are mainly explained. Explanation of similarities to the embodiments explained above is omitted. In FIG. 11, the same components as the components in the embodiments explained above are denoted by the same reference numerals and signs.

A timing signal generating device 1B shown in FIG. 11 includes the GPS receiver 10 (a receiver), a processor 20B, the atomic oscillator 30 (an oscillator), a storage 40B, the GPS antenna 50, and the timer 60.

The processor 20B includes the phase comparator 21, the loop filter 22, a controller 23B, and the divider 24. The controller 23B acquires information necessary for calculation of elevation angle statistical value information of the GPS satellites 2 from the storage 40B, calculates the elevation angle statistical value information of the GPS satellites 2, and switches the first mode and the second mode on the basis of the calculated elevation angle statistical value information of the GPS satellites 2.

Information used for calculation (generation) of statistical value information, which is information concerning a statistical value obtained by performing, at each time, statistical processing of elevation angles of the plurality of GPS satellites 2, is stored in the storage 40B. For example, all kinds of the information used for the calculation of the statistical value information may be stored. For example, when the statistical value information is the secondary data explained above, although the storage 40B is provided as a body separate from the processor 20B in FIG. 11, the storage 40B may be incorporated in the processor 20B (e.g., the controller 23B). The storage 40B is not particularly limited. For example, a nonvolatile memory or a volatile memory can be used.

The information stored in the storage 40B is information concerning, for example, elevation angles of the GPS satellites 2, Ephemeris of the GPS satellites 2, and positions of the GPS satellites 2 at respective times. Such information can be acquired from the GPS receiver 10 or the outside. Therefore, for example, the controller 23B acquires such information from the GPS receiver 10 and stores the information in the storage 40B in advance. The information stored in the storage 40B may be information concerning all the GPS satellites 2 or may be information concerning the GPS satellites 2 that become visible satellites at respective times or the GPS satellites 2 set as reception targets of the GPS receiver 10. The Ephemeris stored in the storage 40B may be Ephemeris effective in future or for a long period (a longer period than a normal effective period) such as prediction Ephemeris.

Information concerning elevation angles at certain time may be stored in the storage 40B. The controller 23B may use the information for a predetermined period. The controller 23B may calculate elevation angles from Ephemeris or satellite positions and obtain statistical value information at every determination timing for the switching of the first mode and the second mode. The controller 23B may calculate elevation angles of the GPS satellites 2 at a predetermined time interval in advance for a predetermined period (e.g., ten minutes, one hour, or three hours) and store the elevation angles in the storage 40B. That is, the statistical value information and the information used for the calculation of the statistical value information may be stored in the storage 40B.

According to the third embodiment explained above, it is also possible to reduce the precision deterioration of the timing signal.

2. Electronic Apparatus

An embodiment of an electronic apparatus is explained.

Figure 12:
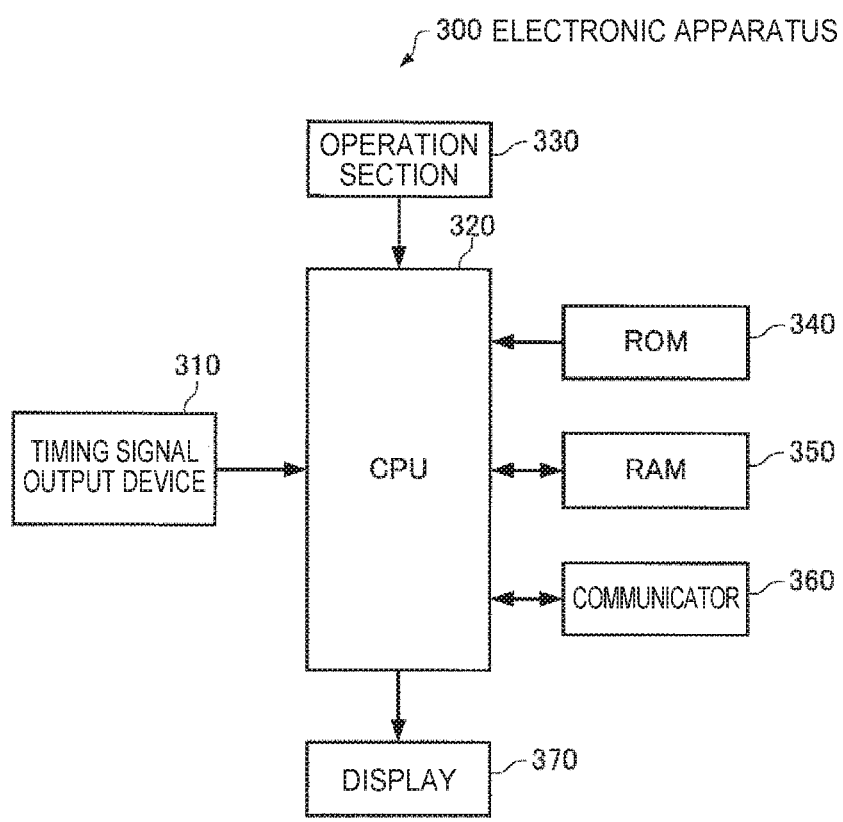
FIG. 12 is a block diagram showing an embodiment of an electronic apparatus.

FIG. 12 is a block diagram showing the embodiment of the electronic apparatus. The embodiment shown in FIG. 12 is explained below. Differences from the embodiments explained above are mainly explained. Explanation of similarities is omitted. In FIG. 12, the same components as the components in the embodiments explained above are denoted by the same reference numerals and signs.

An electronic apparatus 300 shown in FIG. 12 includes a timing signal output device 310, a CPU (Central Processing unit) 320, an operation section 330, a ROM (Read Only Memory) 340, a RAM (Random Access Memory) 350, a communicator 360, and a display 370.

The timing signal output device 310 is, for example, the timing signal output device 1 explained above. As explained above, the timing signal output device 310 receives satellite signals, generates a high-precision timing signal (1PPS), and outputs the high-precision timing signal to the outside.

The CPU 320 performs various kinds of calculation processing and control processing according to computer programs stored in the ROM 340 and the like. Specifically, the CPU 320 performs, in synchronization with a timing signal (1PPS) and a clock signal output by the timing signal output device 310, clocking processing, various kinds of processing corresponding to operation signals output from the operation section 330, processing for controlling the communicator 360 in order to perform data communication with the outside, processing for transmitting a display signal for causing the display 370 to display various kinds of information to the display 370, and the like.

The operation section 330 is an input device configured by operation keys, button switches, and the like. The operation section 330 outputs an operation signal corresponding to operation by a user to the CPU 320.

The ROM 340 has stored therein computer programs, data, and the like for the CPU 320 to perform the various kinds of calculation processing and control processing.

The RAM 350 is used as a work area of the CPU 320. The RAM 350 temporarily stores computer programs and data read from the ROM 340, data input from the operation section 330, results of arithmetic operations executed by the CPU 320 according to various computer programs, and the like.

The communicator 360 performs various kinds of control for establishing data communication between the CPU 320 and an external device.

The display 370 is a display device configured by an LCD (Liquid Crystal Display) and the like. The display 370 displays various kinds of information on the basis of a display signal input from the CPU 320. In the display 370, a touch panel functioning as the operation section 330 may be provided.

Various electronic apparatuses are conceivable as the electronic apparatus 300. The electronic apparatus 300 is not particularly limited. Examples of the electronic apparatus 300 include a server for time management (a time server) that realizes synchronization with standard time, a time managing device (a time stamp server) that performs, for example, issuance of a time stamp, and a frequency reference device such as a base station.

As explained above, the electronic apparatus 300 includes the timing signal output device 310. Consequently, it is possible to reduce precision deterioration of the timing signal. Therefore, it is possible to improve characteristics of the electronic apparatus using the timing signal output from the timing signal output device 310.

3. Vehicle

Figure 13:
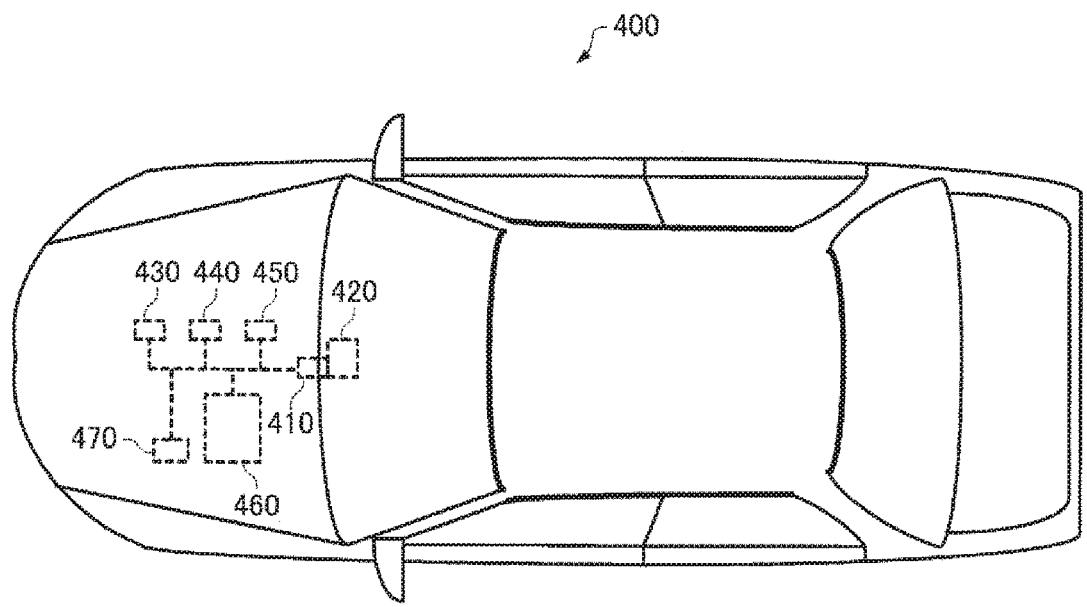
FIG. 13 is a diagram showing an embodiment of a vehicle.

FIG. 13 is a diagram showing an embodiment of a vehicle. The embodiment shown in FIG. 13 is explained below. Differences from the embodiments explained above are mainly explained. Explanation of similarities is omitted. In FIG. 13, the same components as the components in the embodiments explained above are denoted by the same reference numerals and signs.

A vehicle 400 shown in FIG. 13 includes a timing signal output device 410, a car navigation device 420, controllers 430, 440, and 450, a battery 460, and a backup battery 470.

As the timing signal output device 410, the timing signal output device 1 explained above can be applied. For example, during movement of the vehicle 400, the timing signal output device 410 performs positioning calculation on a real-time basis in the normal positioning mode and outputs a clock signal and NMEA data. For example, during a stop of the vehicle 400, the timing signal output device 410 performs a plurality of times of positioning calculation in the normal positioning mode, thereafter sets an average, a mode, or a median of results of the plurality of times of the positioning calculation as present position information, and outputs 1PPS, a clock signal, and NMEA data in the position hold mode.

The car navigation device 420 displays a position, time, and other various kinds of information on a display in synchronization with the 1PPS and the clock signal output by the timing signal output device 410 using the NMEA data output by the timing signal output device 410.

The controllers 430, 440, and 450 perform various kinds of control of an engine system, a brake system, a keyless entry system, and the like. The controllers 430, 440, and 450 may perform various kinds of control in synchronization with the clock signal output by the timing signal output device 410.

As explained above, the vehicle 400 includes the timing signal output device 410. Consequently, it is possible to reduce precision deterioration of the timing signal. Therefore, it is possible to improve characteristics of the vehicle 400 using the timing signal output from the timing signal output device 410.

The vehicle 400 in this embodiment includes the timing signal output device 410. Therefore, it is possible to secure high reliability during the movement and during the stop.

Note that the vehicle 400 shown in FIG. 13 is an automobile. However, various vehicles are conceivable as the vehicle according to the embodiments. Besides the automobile (including an electric automobile), examples of the vehicle according to the embodiments include airplanes such as a jet airplane and a helicopter, ships, rockets, and artificial satellites.

The timing signal output device, the electronic apparatus, and the vehicle according to the embodiments are explained above with reference to the embodiments shown in the figures. However, the embodiments is not limited to the timing signal output device, the electronic apparatus, and the vehicle.

The embodiments can be replaced with a device having any configuration that exhibits the same functions as the functions in the embodiments. Any configuration can be added.

In the embodiments, the timing signal output device that uses the GPS is explained as the example. However, a global navigation satellite system (GNSS) other than the GPS, for example, Galileo or GLONASS (GLObal NAvigation Satellite System) may be used.

What is claimed is:

1. A timing signal output device comprising:
a receiver configured to output a reference signal on the basis of satellite signals received from a plurality of positioning satellites;
an oscillator configured to output a clock signal; and
a processor configured to switch, on the basis of statistical value information concerning a statistical value obtained by performing statistical processing of elevation angles of the plurality of positioning satellites, between a first mode for generating a timing signal based on the reference signal and a second mode for generating a timing signal based on the clock signal,
wherein the statistical value is any one of an average of the elevation angles of the plurality of positioning satellites, a median of the elevation angles of the plurality of positioning satellites, and a mode of the elevation angles of the plurality of positioning satellites, and wherein the elevation angles are previously calculated and stored using at least one of (i) ephemeris data for the plurality of positioning satellites and (ii) known positions of the positioning satellites.

2. The timing signal output device according to claim 1, further comprising a storage in which the previously calculated elevation angles are stored in advance.

3. The timing signal output device according to claim 1, wherein the processor switches the first mode to the second mode when the statistical value is equal to or smaller than a threshold.

4. The timing signal output device according to claim 1, wherein
the receiver outputs elevation angle information concerning the elevation angles of the plurality of positioning satellites, and
the processor acquires the statistical value information using the elevation angle information.

5. The timing signal output device according to claim 1, wherein
an elevation angle mask is set in the receiver, and
the statistical value information is information concerning a statistical value obtained by performing statistical processing of elevation angles of the plurality of positioning satellites located at elevation angles equal to or larger than a set elevation angle of the elevation angle mask.

6. The timing signal output device according to claim 1, wherein the receiver performs statistical processing of times acquired from the satellite signals to generate the reference signal.

7. The timing signal output device according to claim 1, wherein the processor includes:
a synchronization circuit capable of synchronizing the clock signal with the reference signal and generating the timing signal, and
a controller configured to switch an operation state of the synchronization circuit to either one of the first mode and the second mode on the basis of the statistical value information.

8. An electronic apparatus comprising a timing signal output device, the timing signal output device comprising:
a receiver configured to output a reference signal on the basis of satellite signals received from a plurality of positioning satellites;
an oscillator configured to output a clock signal; and
a processor configured to switch, on the basis of statistical value information concerning a statistical value obtained by performing statistical processing of elevation angels of the plurality of positioning satellites, between a first mode for generating a timing signal based on the reference signal and a second mode for generating a timing signal based on the clock signal,
wherein the statistical value is any one of an average of the elevation angels of the plurality of positioning satellites, a median of the elevation angels of the plurality of positioning satellites, and a mode of elevation angels of the plurality of positioning satellites, and wherein the elevation angels are previously calculated and stored using at least one of (i) ephemeris data for the plurality of positioning satellites and (ii) known positions of the positioning satellites.

* * * * *